United States Patent [19]

Balinsky et al.

[11] Patent Number: 4,605,490

[45] Date of Patent: Aug. 12, 1986

[54] PROCESS FOR THE HYDROGENATION OF AROMATIC HYDROCARBONS

[75] Inventors: George J. Balinsky, Randolph, N.J.; Omer Biceroglu, Sarnia, Canada; Joe S. Lin, Torrance, Calif.

[73] Assignee: Exxon Research and Engineering Co., Florham Park, N.J.

[21] Appl. No.: 658,376

[22] Filed: Oct. 5, 1984

[51] Int. Cl.[4] .................. C10G 45/00; C10G 45/54; C07C 5/10

[52] U.S. Cl. .................. 208/143; 208/212; 585/266; 585/269; 502/53

[58] Field of Search .......... 208/143, 211, 212; 585/266, 269; 502/53

[56] References Cited

U.S. PATENT DOCUMENTS

| | | | |
|---|---|---|---|
| 1,894,785 | 1/1933 | Peck | 208/143 |
| 2,906,784 | 9/1959 | Dean et al. | 208/211 |
| 3,048,536 | 8/1962 | Coonradt et al. | 208/110 |
| 3,132,090 | 5/1964 | Helfrey et al. | 208/89 |
| 3,254,021 | 5/1966 | Burgess et al. | 502/53 |
| 3,304,338 | 2/1967 | Parish | 208/143 |
| 3,527,695 | 9/1970 | Lawrence et al. | 208/143 |
| 3,607,728 | 9/1971 | Wilhelm | 585/269 |
| 3,655,551 | 4/1972 | Hass | 208/59 |
| 3,779,899 | 12/1973 | Mears | 208/143 |
| 3,781,199 | 12/1973 | Ward | 208/89 |
| 3,865,716 | 2/1975 | Sosnowski | 208/255 |
| 3,943,053 | 3/1976 | Kovach et al. | 585/266 |
| 4,104,152 | 8/1978 | Hilfman | 208/143 |
| 4,240,900 | 12/1980 | Gilbert | 208/143 |

FOREIGN PATENT DOCUMENTS 838751  6/1960  United Kingdom ............... 208/143

Primary Examiner—Andrew H. Metz
Assistant Examiner—Helane Myers
Attorney, Agent, or Firm—Marthe L. Gibbons

[57] ABSTRACT

A noble metal-containing zeolitic catalyst having cracking activity and hydrogenation activity is pretreated by contacting the catalyst with a nitrogen-containing compound to decrease the cracking activity of the catalyst followed by treatment with hydrogen to recover the hydrogenation activity of the catalyst. The pretreated catalyst is used in a process for the hydrogenation of aromatic hydrocarbons.

11 Claims, No Drawings

PROCESS FOR THE HYDROGENATION OF AROMATIC HYDROCARBONS

BACKGROUND OF THE INVENTION

1. Field of the Invention

The present invention relates to an improvement in a process for the hydrogenation of aromatic hydrocarbons.

2. Description of the Prior Art

Hydrogenation processes in which aromatic compounds alone or contained in hydrocarbonaceous oils are hydrogenated in the presence of hydrogen and a suitable catalyst are known.

U.S. Pat. No. 3,655,551 discloses that Group VIII noble metals, such as palladium or platinum on zeolites, exhibit high hydrogenation activity such that if a substantially sulfur-free atmosphere is maintained, effective hydrogenation activity of aromatics can occur at 200° to 500° F., pressures of 500 to 3000 psig and a space velocity of 0.5 to 2.0 and those conditions can be correlated such that little or no cracking occurs.

U.S. Pat. No. 4,240,900 discloses pretreating hydrocracking catalysts with nitrogen-containing organic compounds to suppress the cracking activity and subsequently using the treated catalyst to hydrogenate olefins and aromatic compounds contained in a hydrocarbonaceous stream.

It has now been found that improved hydrogenation can be obtained by utilizing a pretreated catalyst that has been stripped with hydrogen after being treated with a nitrogen compound to suppress its cracking activity.

SUMMARY OF THE INVENTION

In accordance with the invention, there is provided a process for the hydrogenation of aromatic hydrocarbons which comprises contacting a hydrocarbonaceous feed comprising aromatic hydrocarbons at hydrogenation conditions with added hydrogen and in the substantial absence of an inorganic sulfur compound with a catalyst which has been pretreated by a method which comprises the steps of: (a) contacting a catalyst having cracking activity and hydrogenation activity with a nitrogen-containing compound at conditions, and for a time sufficient to decrease the cracking activity of said catalyst, whereby the hydrogenation activity of said catalyst is also decreased, said catalyst comprising at least one noble metal component of Group VIII of the Periodic Table of Elements composited with a Y-type crystalline aluminosilicate zeolite and a non-zeolitic inorganic oxide, and (b) contacting the nitrogen-contacted catalyst with a hydrogen-containing gas at conditions and for a time sufficient to increase the hydrogenation activity of said nitrogen-contacted catalyst.

DETAILED DESCRIPTION OF THE INVENTION

Feeds

The hydrogenation process of the present invention is suitable to hydrogenate a single type or a mixture of types of pure aromatic hydrocarbons as well as for the hydrogenation of aromatic hydrocarbons contained in a mixture of hydrocarbons such as hydrocarbonaceous oil feeds. The aromatic-containing hydrocarbonaceous oils may be derived from any source such as petroleum, shale oil, tarsand oil, coal liquefaction products and mixtures thereof. Preferably, the hydrocarbonaceous oil feed comprises at least about 20 weight percent aromatic compounds. Suitable aromatic-containing hydrocarbonaceous oils include oils having atmospheric pressure boiling points ranging from about 100° to about 1050° F., preferably from about 300° to about 700° F. More preferably, the feeds used for the hydrogenation stage of the present invention have a low organic nitrogen content and a low organic sulfur content, typically less than 500 wppm organic sulfur on feed, preferably less than 100 wppm organic sulfur and less than 20 wppm nitrogen on feed, typically less than 5 wppm nitrogen on feed. If the organic nitrogen and the organic sulfur contents are not low enough, the nitrogen and sulfur contents can be lowered by pretreating the hydrocarbonaceous oil utilizing conventional hydrotreating catalysts and hydrogen at hydrotreating conditions and separating the gaseous phase comprising ammonia and hydrogen sulfide from the hydrotreated oil. The hydrotreated oil is subsequently used as feed for the aromatics hydrogenation stage of the present invention.

The Aromatics Hydrogenation Catalysts

The catalysts that are suitable for use in the pretreatment of the present invention comprise a Group VIII noble metal hydrogenation component, a Y-type crystalline aluminosilicate zeolite and a nonzeolitic inorganic oxide matrix or binder. Such catalysts have both cracking activity and hydrogenation activity and are typically used as hydrocracking catalysts. By "noble metal" is intended herein a metal of Group VIII of the Periodic Table of Elements selected from the group consisting of Ru, Rh, Pd, Os, Ir, Pt, and mixtures thereof. The Periodic Table of Elements referred to herein is in accordance with the table in *Handbook of Chemistry and Physics*, Chemical Rubber Publishing Company, Cleveland, Ohio, 45th Edition, 1964. Suitable zeolites are Y-type zeolites, naturally occurring and synthetically prepared, with silica to alumina mole ratios of at least 3 and uniform pore-openings ranging from about 6 to about 15 Angstroms and the structure of faujasite. Preferably, the Y-type zeolite is an ultrastable Y-type zeolite. Ultrastable Y-type zeolites are described, for example, in U.S. Pat. No. Re 28,629 (Reissue of U.S. Pat. No. 3,402,996); U.S. Pat. No. 3,293,192; U.S. Pat. No. 3,781,199 and U.S. Pat. No. 4,036,739. In general, ultrastable, with reference to Y-type zeolite refers to a zeolite which is highly resistant to degradation of crystallinity by high temperature and steam treatment and which has a unit cell size not greater than about 24.5 Angstroms. Suitable non-zeolitic inorganic oxide components include alumina, silica, magnesia, beryllia, titania, boria, zirconia, chromia, and mixtures thereof. Clays comprising silica and alumina and acid treated clays may also be used as the inorganic oxide component of the catalyst. Preferably, the inorganic oxide is essentially alumina. If desired, an additional catalytic component such as Group VIB or a non-noble Group VIII metal component and mixtures thereof may be composited with the catalyst. The zeolite may be present in a catalyst in amounts ranging from about 0.5 to 98 weight percent, preferably from about 2 to about 80 weight percent based on the total catalyst. The Group VIII noble metal component, calculated as elemental metal, may be present from about 0.1 to about 2 weight percent based on the total catalyst. The preferred catalyst comprises palladium composited with a hydrogen form of an ultrastable Y-type zeolite and alumina, most preferably, a catalyst comprising about 80 weight percent hydrogen form of ultrastable Y, 20 weight percent alumina, based on the total catalyst, and about 0.5 weight percent palladium based on the weight of the zeolite. Such catalysts are described in U.S. Pat. Nos. 3,926,784; 3,945,943 and 3,781,199, the teachings of which are hereby incorporated by reference.

Catalysts of the above-described type possess hydrogenation activity as well as cracking activity. When it is desired to use such catalysts as hydrogenation catalysts, particularly as catalysts for the hydrogenation of aromatic compounds contained in a mixture of hydrocarbons, while minimizing the cracking activity or conversion of hydrocarbons to lower boiling products, in accordance with the present invention, the catalysts are subjected to the treatment of the present invention as follows: a catalyst comprising a Group VIII noble metal component, a Y-type zeolite and a non-zeolitic inorganic oxide is first contacted with a nitrogen-containing compound at conditions, and for a time sufficient to decrease the cracking activity of the catalyst. Suitable temperatures for the nitrogen compound contacting step include a temperature ranging from about 200° to about 800° F., preferably, a temperature ranging from about 400° to about 600° F. Suitable nitrogen-containing compounds include inorganic nitrogen-containing compounds such as ammonia, inorganic nitrogen compound precursors such as inorganic or organic compounds that decompose to ammonia, for example, aliphatic amines such as butyl amine, isopropyl amine, etc., organic nitrogen-containing compounds that do not decompose to inorganic nitrogen compounds such as, for example quinoline, pyridine, acridine, and mixtures of any of these nitrogen-containing compounds including nitrogen-containing compounds that occur naturally in hydrocarbonaceous oils. Preferably, the nitrogen-containing compound contacting step is performed by contacting the catalyst with a hydrocarbonaceous oil that comprises one or more organic nitrogen-containing compounds in an amount ranging from about 1 to about 1000 wppm, preferably from about 10 to about 200 wppm nitrogen, calculated as if the nitrogen existed as elemental nitrogen based on the oil. When a hydrocarbonaceous oil containing nitrogen compounds is used to deactivate the catalyst, the catalyst deactivation step is, preferably, conducted in the presence of hydrogen. The hydrogen partial pressure of the hydrogen during the nitrogen compound contacting step may range from about 100 to about 2000 psia. The total pressure during the nitrogen contacting step (catalyst deactivation step) may suitably range from about 200 to about 2500 psig, preferably from about 400 to about 2000 psig. The nitrogen contacting treatment is generally conducted for a time ranging from about 4 to 600 hours, such as to contact the catalyst with from about 0.05 to about 5 weight percent, preferably from about 0.2 weight percent to about 2 weight percent nitrogen, calculated as elemental nitrogen, based on the weight of the catalyst. When a hydrocarbonaceous oil comprising nitrogen-containing compounds is used for the deactivation step, suitable hydrocarbonaceous oils include those having atmospheric boiling points ranging from about 100° to about 1050° F., preferably from about 300° to about 700° F. If the hydrocarbonaceous oil to be used for the deactivation treatment has a lower nitrogen content, suitable nitrogen-containing compounds may be added to the oil prior to using the oil in the catalyst deactivation step. Treatment of the catalyst with a nitrogen-containing compound decreases not only the cracking activity of the catalyst but also its hydrogenation activity. Therefore, in accordance with the present invention, the at least partially deactivated catalyst which has decreased cracking and decreased hydrogenation activity is stripped with a hydrogen-containing gas at conditions and for a time sufficient to increase the hydrogenation activity of the catalyst without significantly increasing the cracking activity of the catalyst. The hydrogen stripping step is performed by contacting the nitrogen-treated catalyst with a hydrogen-containing gas at a temperature ranging from about 400° to about 1000° F., preferably from about 600° to about 800° F., a total pressure ranging from about 200 to about 2500 psig, preferably from about 400 to about 2000 psig, a hydrogen partial pressure ranging from about 100 to about 2000 psig, preferably from about 200 to about 1600 psig. Suitable periods of time for the hydrogen stripping treatment include from about 1 hour to about 500 hours, preferably from about 5 to about 50 hours. The catalyst resulting from the hydrogen stripping treatment is suitable for use in the hydrogenation of aromatic hydrocarbons, particularly for the hydrogenation of aromatic hydrocarbons contained in the hydrocarbonaceous oil.

Suitable hydrogenation conditions to hydrogenate aromatic hydrocarbons using the above-described pretreated catalyst are summarized in Table I.

TABLE I

| HYDROGENATION CONDITIONS | | |
| --- | --- | --- |
| Conditions | Broad Range | Preferred Range |
| Temperature, °F. | 300–800 | 400–600 |
| Total pressure, psig | 200–2,500 | 400–2,000 |
| Liquid hourly space velocity, (V/V/HR) | 0.2–6.0 | 0.5–4.0 |
| Hydrogen rate, SCF/BBL | 1,000–10,000 | 2,000–6,000 |

The hydrogenation is conducted in the substantial absence of an inorganic sulfur compound, that is, the hydrogenation zone is substantially hydrogen sulfide free, i.e., has a hydrogen sulfide partial pressure of less than about 0.5 psia.

The pretreated catalyst of the present invention can be disposed in the hydrogenation zone in a fixed bed, moving bed, ebullating bed, fluidized bed, disperse phase (transferline), slurry process, etc.

All boiling points referred to herein are equivalent atmospheric pressure boiling points unless otherwise specified.

DESCRIPTION OF THE PREFERRED EMBODIMENTS

The following examples are presented to illustrate the invention.

EXAMPLE 1

A catalyst, herein designated catalyst A, had the following composition: 0.52 weight percent palladium calculated as elemental metal, 80 weight percent of the hydrogen form of an ultrastable Y-type zeolite and about 20 weight percent non-zeolitic alumina, all weights being based on the total catalyst. Catalyst A was contacted with a hydrocarbonaceous oil having an atmospheric pressure boiling point ranging from about 270° to about 700° F. and having a nitrogen content of about 5 to about 8 wppm and a sulfur content of about 26 to 45 wppm for about 103 days at a temperature ranging from about 415° to about 570° F. and a space velocity (LHSV) ranging from about 0.7 to about 1.5 and a hydrogen partial pressure of 1250 psig. The resulting catalyst, herein designated catalyst B, was contacted with hydrogen at 700° F. for 12 hours in the absence of a hydrocarbonaceous oil. The hydrogen treated catalyst is herein designated catalyst C. Catalysts A, B and C were used as hydrogenation catalysts. Catalyst C is a catalyst in accordance with the present invention. The feed used for the hydrogenation process activity determination before and after the treatment was a feed having an atmospheric pressure boiling point ranging from about 90° to about 700° F., a nitrogen content of less than 1 wppm, a sulfur content of about 4 wppm and a content of aromatic hydrocarbons of 23 volume percent. The hydrogenation conditions for the activity determination before and after the treatment were: a temperature of about 417° F., a hydrogen partial pressure of about 1200 psia. The results are summarized in Table II.

TABLE II

| Description | Before Nitrogen Treatment | At Start of Nitrogen Treatment | At End of Nitrogen Treatment | After Stripping With Hydrogen |
| --- | --- | --- | --- | --- |
| Catalyst | A | — | B | C |
| Days on Oil | 21 | 23 | 118 | 140 |
| % Aromatic Saturation | 79.5 | 77 | 72 | 78.4 |
| 350° F.+ Conv., Vol. % | 50.6 | 51.4 | 3.4 | 1.7 |
| Feed | | | | |
| Sulfur, wppm | 4 | 26 | 30 | 4 |
| Nitrogen, wppm | <1 | 5 | 8 | <1 |
| Aromatics, Vol. % | 23 | 37 | 37 | 23 |
| Temp., °F. | 417 | 419 | 538 | 417 |
| Liquid Hourly Space Velocity (V/V/Hr) | 1.0 | 1.0 | 1.0 | 1.0 |

The data in Table II show that catalyst A, which had not been hydrogen treated, had a very good aromatic saturation activity and high conversion activity (day 21). After 21 days, treatment with an oil containing organic nitrogen compounds and organic sulfur compounds was started. At the start of the treatment with the higher nitrogen level feed (day 23), both the saturation and conversion activity was still high. However, during the course of the nitrogen-containing oil treatment, the catalyst lost both saturation activity and conversion activity. Thus, the temperature had to be increased from 419° F. to 539° F. to obtain about the same level of aromatic saturation. It should also be noted that the conversion had been severely depresssed by the nitrogen-containing oil treatment since it went from 51.4 volume percent at 419° F. to only 3.4 volume percent at 538° F. After day 126, the catalyst was contacted with hydrogen at 700° F. for 12 hours. This catalyst is herein designated catalyst C. The saturation activity of the catalyst was then tested with the same feed that was used at the start of the run. As can be seen from the data in Table II, the saturation activity, after stripping the catalyst with hydrogen, was as good as the activity of the catalyst before the treatment with the nitrogen-containing oil. Hence, from these data, it would appear that the hydrogen treatment for hydrogen stripping recovered the saturation activity of the catalyst that was lost by the nitrogen-containing oil treatment. However, it should be noted that the conversion activity, even after the hydrogen stripping treatment, was much lower than the conversion activity observed with the catalyst that had not been treated with the nitrogen-containing oil (catalyst A), i.e., 1.7 volume percent 350° F.+conversion at day 140 versus 50.6 volume percent conversion at day 21 with the catalyst that had not been treated with the nitrogen-containing oil.

EXAMPLE 2

Another portion of catalyst A was contacted for 56 days with a hydrocarbonaceous oil, herein designated Feedstock P, having an atmospheric pressure boiling point ranging from about 350° F. to about 650° F. and having a nitrogen content of about 0.3 wppm and a sulfur content of about 30 wppm. The performance of Catalyst A after 56 days on-oil is shown in Table III. Beginning at Day 57 and continuing for eight days, the hydrocarbonaceous oil was spiked with 4 wppm nitrogen using n-butyl amine and processed over Catalyst A to produce Catalyst D. As shown in Table III, the treatment with the nitrogen-spiked feedstock reduced both the hydrogenation and conversion activity of the catalyst. Beginning at Day 65 and continuing for nine days, the hydrocarbonaceous oil was spiked with 32 wppm nitrogen using n-butyl amine and processed over Catalyst D to produce Catalyst E. As shown in Table III, the feed further reduced the hydrogenation activity and conversion activity of the catalyst. After Day 73, Catalyst E was subjected to a 16-hour hydrogen treatment at 700° F. in the substantial absence of hydrocarbonaceous oil at 1200 psig. Following this treatment, the catalysts was again contacted with Feedstock P for two days. Although substantial improvement in hydrogenation performance was observed, the hydrogenation performance was not fully as good as that of Catalyst A. Consequently, after Day 75 the catalyst was subjected to a second 16-hour hydrogen treatment at 700° F. in the substantial absence of hydrocarbonaceous oil at 1200 psig. Beginning at Day 76, the catalyst was again contacted with Feedstock P for eleven days to produce Catalyst F, whose lined out performance is shown in Table III. As seen in Table III, Catalyst F has recovered substantially all of its hydrogenation activity after the hydrogen treatments; yet its conversion has been significantly depressed relative to Catalyst A. Catalyst F is a catalyst in accordance with the present invention.

TABLE III

| | Catalyst Condition | | | |
|---|---|---|---|---|
| | Before Nitrogen Treat | After Eight Days of 4 PPM Nitrogen Treat | After Additional Nine Days Nitrogen Treat at 32 PPM | After H$_2$ Treat |
| Catalyst | A | D | E | F |
| Hydrogenation Activity | Base | 0.52 × Base | 0.22 × Base | 1.0 × Base |
| 320° F.+ Conversion | 29 | 21 | 9 | 5 |
| Feed | P | P + 4 WPPM N | P + 32 WPPM N | P |
| On-Oil Conditions | | | | |
| Pressure, psig | | ← 1200 → | | |
| Temperature, °F. | | ← 470 → | | |

EXAMPLE 3

The results obtained in Example 3 were obtained in a manner substantially similar to that used in Example 2, except that as shown in Table IV, the operating pressure was 920 psig for Example 3 vs. 1200 psig for Example 2. Thus, a portion of Catalyst A was contacted for 56 days with a hydrocarbonaeceous oil, herein designated Feedstock P, having an atmospheric pressure boiling point ranging from about 350° F. to about 650° F. and having a nitrogen content of about 0.3 wppm and a sulfur content of about 30 wppm. The performance of Catalyst G after 56 days on-oil is shown in Table IV. Beginning at Day 57 and continuing for eight days, the hydrocarbonaceous oil was spiked with 4 wppm nitrogen using n-butyl amine and processed over Catalyst G to produce Catalyst H. As shown in Table IV, the treatment with the nitrogen-spiked feedstock reduced both the hydrogenation and conversion activity of the catalyst. Beginning at Day 65 and continuing for nine days, the hydrocarbonaceous oil was spiked with 32 wppm nitrogen using n-butyl amine and processed over Catalyst H to produce Catalyst I. As shown in Table IV, the additional treatment with the nitrogen-spiked feed further reduced the hydrogenation activity and conversion activity of the catalyst. After Day 73, Catalyst I was subjected to a 16-hour hydrogen treatment at 700° F. in the substantial absence of hydrocarbonaceous oil at 920 psig. Following this treatment, the catalyst was again contacted with Feedstock P for two days. Although substantial improvement in hydrogenation performance was observed, the hydrogenation performance was not fully as good as Catalyst A. Consequently, after Day 75 the catalyst was subjected to a second 16-hour hydrogen treatment at 700° F. in the substantial absence of hydrocarbonaceous oil at 920 psig. Beginning at Day 76 the catalyst was again contacted with Feedstock P for eleven days to produce Catalyst J, whose lined out performance is shown in Table IV. As seen in Table IV, Catalyst J had recovered most of its hydrogenation activity after the hydrogenation treatment; yet its conversion has been significantly depressed relative to Catalyst A. Catalyst J is a catalyst in accordance with the present invention.

TABLE IV

| | Catalyst Condition | | | |
|---|---|---|---|---|
| | Before Nitrogen Treatment | After Eight Days of 4 PPM Nitrogen Treat | After Additional Nine Days Nitrogen Treat at 32 PPM | After H$_2$ Treat |
| Catalyst | G | H | I | J |
| Hydrogenation Activity | Base | 0.64 × Base | 0.37 × Base | 0.85 × Base |
| 320° F.+ Conversion vol. % | 28 | 27 | 16 | 5 |
| Feed | P | P + 4 WPPM N | P + 32 WPPM N | P |
| On-Oil Conditions | | | | |
| Pressure, psig | | ← 920 → | | |
| Temperature, °F. | | ← 470 → | | |

EXAMPLE 4

Four side-by-side comparison runs were each made with Catalyst A. As shown in Table V, Run 1 was made with a hydrocarbonaceous feed, herein designated feedstock Q, having a boiling point ranging from about 325° F. to about 660° F. containing 0.7 wppm of naturally occurring organic nitrogen and 11.8 wppm of naturally occurring organic sulfur. Run 2 was made in a manner similar to Run 1, except the catalyst was contacted with Feedstock Q to which had been added 3.0 wppm nitrogen using quinoline as the spiking agent to produce a feedstock identical in all respects to Feedstock Q, except that it contained 3.7 wppm nitrogen. Run 3 was made with a hydrocarbonaceous feed, herein designated Feedstock R, having a boiling point ranging from about 400° F. to about 700° F. containing 0.2 wppm of naturally occurring organic nitrogen and 18 wppm of naturally occurring sulfur. Run 4 was made in a manner similar to Run 3, except the catalyst was contacted with Feedstock R to which had been added 22 wppm sulfur using dibenzothiophene. Reference to Table V shows the very deleterious effect of nitrogen on the hydrogenation activity of the catalysts of this example. That is, Runs 1 and 2 were made in essentially identical manners, except for feedstock nitrogen content. Yet, the catalyst in Run 2, which processed the higher nitrogen content feed, had undergone a much larger loss in activity than the catalyst in Run 1. It is believed that if Run 2 had continued uninterrupted to Day 88, the projected activity for the catalyst at Day 88 would be only 8% of the activity it had at Day 36. This is in contrast to Run 1, where the catalyst at Day 88 had retained 62% of the activity it possessed at Day 36. Furthermore, Table V shows that the deleterious effect of sulfur on hydrogenation activity maintenance was much less severe than the effect of nitrogen on activity maintenance. That is, Runs 3 and 4 were made with identical nitrogen levels and substantially different sulfur levels. Despite the substantially different sulfur levels, the amount of hydrogenation activity lost between Day 36 and 88 was reasonably similar. The activity lost between Day 36 and Day 88 for the two runs at 18 and 40 wppm sulfur was slightly less than the activity lost in Run 1 at a lower, 11.8 wppm, sulfur level. This illustrates that the deleterious effect of sulfur on activity maintenance was not as severe as the deleterious effect of nitrogen on activity maintenance.

TABLE V

| Run | 1 | 2 | 3 | 4 |
|---|---|---|---|---|
| Feedstock | Q | Q + 3 WPPM Nitrogen | R | R + 22 WPPM Sulfur |
| Sulfur, wppm | ← 11.8 → | | 18 | 40 |
| Nitrogen, wppm | 0.7 | 3.7 | ← 0.2 → | |
| Hydrogenation Activity | | | | |
| Day 36 | Base 1 | Base 2 | Base 3 | Base 4 |
| Day 88 | 0.62 × Base 1 | 0.23 × Base 2[1] | 0.76 × Base 3 | 0.70 × Base 4 |

[1] At Day 63 because unit upset occurred at Day 64.

Run 1 was continued, and after Day 104 (total of 90 days on-oil) the catalyst from Run 1 was treated with hydrogen at 700° F. and 1400 psig in the substantial absence of hydrocarbonaceous oil for about 24 hours. After the hydrogen treatment, Feedstock Q was reintroduced and the catalyst performance monitored. Table VI shows the lined out performance measured at Days 111 to 115 after the hydrogen treatment. Table VI shows that the catalyst from Run 1, after the combination nitrogen treatment at 0.7 wppm (90 total days on-oil) and hydrogen treatment at 700° F., has recovered substantially all of the hydrogenation activity it had possessed at Days 36-41. However, the conversion activity at Days 111-115, after the combination treatment, was significantly suppressed relative to the conversion activity at Days 36-41.

TABLE VI

| | Run 1 | | |
|---|---|---|---|
| | Day 36-41 | Day 81-88 | Day 111-125 After H$_2$ Treat |
| Hydrogenation Activity | Base 1 | 0.65 × Base 1 | 1.0 × Base 1 |
| 320° F.+ Conversion, Vol % | 9.5 | 2.6 | 4.7 |

Although a unit upset at Day 64 precluded the uninterrupted continuation of the on-oil portion of Run 2, the catalyst in Run 2 was subjected, at Day 104 (total of 66 days on-oil), to the same hydrogenation treatment as the catalyst in Run 1 (700° F., 1400 psig, 24 hours). After the hydrogen treatment, it was possible to re-establish on-oil operations for a very limited period of time. Although it was necessary to discontinue the on-oil operation before the catalyst performance was fully lined out, Table VII shows that the catalyst, after the combination treatment (3.7 wppm nitrogen for 66 days plus hydrogen treatment at 700° F. for 24 hours), was effective at recovering hydrogenation (saturation) activity while suppressing cracking (conversion) activity.

TABLE VII

| | Run 2 | |
|---|---|---|
| | Day 36-41 | Day 105-107 |
| Hydrogenation Activity | Base 2 | 1.16 × Base 2 |

TABLE VII-continued

| | Run 2 | |
|---|---|---|
| | Day 36-41 | Day 105-107 |
| 320° F.+ Conversion, Vol % | 5.3 | 0.4 |

What is claimed is:

1. A process for the hydrogenation of aromatic hydrocarbons, which comprises contacting a hydrocarbonaceous feed comprising aromatic hydrocarbons and less than about 5 wppm organic nitrogen at hydrogenation conditions with added hydrogen and a hydrogen sulfide partial pressure of less than about 0.5 psia with a catalyst which has been pretreated by a method which comprises the steps of:
   (a) contacting a catalyst having cracking activity and hydrogenation activity with a nitrogen-containing compound at conditions and for a time sufficient to decrease the cracking activity of said catalyst, whereby the hydrogenation activity of said catalyst is also decreased, said catalyst comprising at least one noble metal component of Group VIII of the Periodic Table of Elements composited with a Y-type crystalline aluminosilicate zeolite and a non-zeolitic inorganic oxide, and
   (b) contacting the nitrogen-contacted catalyst resulting from step (a) with a hydrogen-containing gas at conditions and for a time sufficient to increase the hydrogenation activity of said nitrogen-contacted catalyst.

2. The process of claim 1 wherein said nitrogen compound is an inorganic nitrogen compound or an inorganic compound nitrogen compound precursor.

3. The process of claim 1 wherein said nitrogen compound is an organic nitrogen-containing compound.

4. The process of claim 1 wherein said nitrogen-containing compound is contained in a hydrocarbonaceous oil and wherein said catalyst is contacted with said nitrogen-containing compound in the presence of hydrogen.

5. The process of claim 1 wherein said conditions of step (a) include a temperature ranging from about 200° to about 800° F., a total pressure ranging from about 200 to about 2500 psig and a time period ranging from about 4 to about 600 hours.

6. The process of claim 1 wherein said hydrogen-contacting of step (b) is conducted at a temperature ranging from about 400° to about 1000° F. and at a hydrogen partial pressure ranging from about 100 to about 2000 psig.

7. The process of claim 1 wherein said hydrogenation conditions include a temperature ranging from about 300° to about 800° F., a total pressure ranging from about 200 to about 2,500 psig.

8. The process of claim 1 wherein said Y-type zeolite is an ultrastable Y-type zeolite having a unit cell size of less than about 24.5 and wherein said Group VIII noble metal component is a palladium component.

9. The process of claim 1 wherein said zeolite is present in said catalyst in an amount ranging from about 0.5 to about 98 weight percent, based on the total catalyst, and wherein said noble metal component is present in said catalyst in an amount ranging from about 0.1 to about 2 weight percent, calculated as elemental metal.

10. The process of claim 1 wherein said non-zeolitic inorganic oxide is selected from the group consisting of alumina, silica, magnesia, beryllia, zirconia, titania, chromia, thoria, bromia, and mixtures thereof.

11. The process of claim 1 wherein said hydrocarbonaceous oil feed comprises an organic sulfur contaminant and where prior to said hydrogenation, said hydrocarbonaceous oil is contacted with a hydrogen-containing gas at hydrorefining conditions to produce an effluent comprising a normally gaseous product containing hydrogen sulfide and a normally liquid product comprising a hydrorefined oil having a decreased amount of organic sulfur, separating said gaseous product comprising said hydrogen sulfide from said normally liquid product, and passing at least a portion of said hydrorefined oil to said hydrogenation zone.

* * * * *